(12) United States Patent
Sulak et al.

(10) Patent No.: US 8,151,197 B1
(45) Date of Patent: Apr. 3, 2012

(54) ON-LINE SYSTEM FOR CREATING A PRINTABLE PRODUCT

(75) Inventors: Jason Sulak, Colleyville, TX (US);
Andrew Cohen, Colleyville, TX (US);
Bruce T. Petro, Avon Lake, OH (US)

(73) Assignee: American Greetings Corporation, Cleveland, OH (US)

( * ) Notice: Subject to any disclaimer, the term of this patent is extended or adjusted under 35 U.S.C. 154(b) by 1640 days.

(21) Appl. No.: 09/629,370

(22) Filed: Jul. 31, 2000

(51) Int. Cl.
*G06F 17/30* (2006.01)
*G06F 3/048* (2006.01)

(52) U.S. Cl. ........ 715/744; 715/234; 715/962; 715/968; 715/970.1

(58) Field of Classification Search ................. 700/233, 700/95; 345/962, 744, 748, 835, 855, 846, 345/740, 738; 704/272; 707/525, 513; 705/408, 705/24, 27; 283/117; 709/203; 715/513, 715/234, 744, 962, 968, 970.1
See application file for complete search history.

(56) References Cited

U.S. PATENT DOCUMENTS

| | | | |
|---|---|---|---|
| 5,552,994 A | 9/1996 | Cannon et al. | ................. 700/95 |
| 5,600,563 A | 2/1997 | Cannon et al. | |
| 5,742,768 A * | 4/1998 | Gennmaro et al. | ...... 295/200.33 |
| 5,748,484 A | 5/1998 | Cannon et al. | |
| 5,751,590 A | 5/1998 | Cannon et al. | |
| 5,930,810 A * | 7/1999 | Farros et al. | ................. 715/506 |
| 6,295,058 B1 * | 9/2001 | Hsu et al. | ................. 345/769 |
| 6,311,214 B1 * | 10/2001 | Rhoads | ................. 709/217 |
| 6,313,835 B1 * | 11/2001 | Gever et al. | ................. 345/846 |
| 6,364,553 B1 * | 4/2002 | McCue, Jr. et al. | |
| 6,460,072 B1 * | 10/2002 | Arnold et al. | ................. 709/203 |
| 6,494,571 B1 * | 12/2002 | Finkel | ................. 347/106 |
| 6,665,573 B1 * | 12/2003 | Blackman | ................. 700/116 |
| 6,704,120 B1 * | 3/2004 | Leone, III et al. | ................. 358/1.18 |
| 2001/0034746 A1 * | 10/2001 | Tsakiris et al. | ................. 707/517 |

OTHER PUBLICATIONS

"Helpers and Plug-In's", Jan. 10, 1997, PC Lube and Tune, p. 1.*
The American Heritage Dicitionary of the English Language, Fourth Edition Copyright 2000, Houghton Mifflin Company.*

* cited by examiner

*Primary Examiner* — Namitha Pillai
(74) *Attorney, Agent, or Firm* — Roetzel & Andress

(57) ABSTRACT

A system for providing on-line creation of printable products such as, announcements, banners, business cards, calendars, greeting cards, certificates, craft cards, envelopes, gift tags, invitations, labels, message cards, origami, postcards, posters, stationary, stickers, and other social expression products. The printable products are selectable from a list, and modifiable on-line to provide a user-customized product. The customized printable product may be printed at the user's local printer or stored in a file for later access. Modifications to the printable product include modification of text elements (e.g., formatting, such as font, point size, color, and alignment), and graphical elements. A plug-in is downloaded to a user's PC to enhance the functionality of the user's browser to customize and print the printable product.

5 Claims, 9 Drawing Sheets

TEXT ELEMENT #1

| ID | CATEGORY | PANEL NO. | FONT | PT. SIZE | COLOR | STARTING POSITION UPPER LEFT OVER | STARTING POSITION UPPER LEFT DOWN | STARTING POSITION UPPER RIGHT OVER | STARTING POSITION UPPER RIGHT DOWN | ALIGN | TEXT STRING |
|---|---|---|---|---|---|---|---|---|---|---|---|
| BDAY1 | B-DAYCARD | 1 | ARIAL | 10 | FF FF FF | .5 | .5 | .4 | .5 | L | HAPPY BIRTHDAY BRUCE |

Fig.3

GRAPHIC ELEMENT #1

| ID | CATEGORY | PANEL NO. | UPPER LEFT POSITION OVER | UPPER LEFT POSITION DOWN | UPPER RIGHT POSITION OVER | UPPER RIGHT POSITION DOWN | FILE NAME |
|---|---|---|---|---|---|---|---|
| | | 1 | 2 | 3 | 4 | 5 | MAN.GIF |

Fig.4

Holidays
Graduation | Grandparent's Day | Jewish New Year | more...

Just Because
Family | Funny | Kids | Miss You | Movie Titles | Say "Hi" | Sorry | Sports Page | Thinking of You | Workplace Humor Friendship
Best Friends | Funny | Magazine Covers | Religious | Thank You | Thinking of You Love
Famous Lovers | Funny | Intimate Moments | Love Letters | Loving You | Miss You | Making Up | More Than Friends | Magazine Covers | Religious Birthday
Belated | Co-worker | Family | Funny | Funny Love | Kids | Love | Milestone | Over the Hill | Religious | Special People | Teen | more...

Romantic Events
Anniversary | Bridal Shower | Engagement | Wedding

Baby
Congratulations | Baptism & Christening | Announcements | Invitations

To Kids
Birthday | Congratulations | Get Well | Just Because | Miss You | Thanks | more...

Life Events
Announcements | Congratutations | Good Luck | Good-bye | Graduation | Invitations | Retirement | Thank You Concern & Support
Encouragement | Get Well | Sympathy Collections
Birthday Bear | Care Bears | Holly Hobbie | Love Letters | Madballs | Special Blessings | Strawberry Shortcake | Sports Page | Workplace Humor | more...

Inspirational & Religions
Christian | Islam | Jewish

Spanish
Birthday | Love | Thinking of You | more...

Business
Announcements | Birthday | Congrats | Invitations | Retirement | Thank You | more...

ON-LINE SYSTEM FOR CREATING A PRINTABLE PRODUCT

FIELD OF INVENTION

The present invention generally relates to a system for creating printable products, such as announcements, banners, business cards, calendars, greeting cards, certificates, craft cards, envelopes, gift tags, invitations, labels, message cards, origami, postcards, posters, stationary, and stickers. More particularly the present invention relates to a system accessible via a computer network for creating customized printable products.

REFERENCE TO COMPUTER PROGRAM LISTING APPENDIX

Incorporated herein by reference is a Computer Program Listing Appendix. The Computer Program Listing Appendix is included on two copies of a compact disc in accordance with 37 C.F.R. 1.96(c)(2), 37 C.F.R. 1.52(e), and MPEP 608.05. Each compact disc is labeled as follow: Inventors Sulak, Petro, and Cohen; Title of Invention: On-Line System for Creating a Printable Product; Ser. No. 09/629,370; created Apr. 10, 2003; the first copy is labeled "Copy 1" and the second copy is labeled "Copy 2". Each compact disc contains two-hundred seven files in five folders with a total size of 2,473,984 bytes.

BACKGROUND OF THE INVENTION

Systems for creating printable products are generally comprised of five basic components, namely, (1) a "composition engine" component for composing the printable product, (2) a "menu" component for facilitating operation of the system, (3) an "assets" component which provide the visual and formatting content (e.g., graphic elements, text elements, text and graphics formatting data) for the printable product, (4) an "assembly" component for assembling a printable product file suitable for printing, and (5) a "printing" component for printing the printable product.

Current products for creating printable products are sold as software packages installed by a user on their personal computer. Examples of such products include American Greetings® CreataCard® and Mindscape® Printshop®. In these products, the composition engine, menu, asset, assembly and printing components initially reside one or more computer disks (e.g., floppy disk, CD-ROM, DVD). All or portions of these components are loaded into the hard drive of a personal computer for execution by the CPU.

The foregoing approach to creation of printable products has several drawbacks. In order to provide a user with a very large selection of assets for a variety of different printable products, a plurality of disks are needed. Thus, a user must shuffle several disks in and out of the personal computer disk/CD ROM drive in order to review and select the desired assets for a printable product. Alternatively, a user can load the assets to their hard drive which consumes significant storage resources of the user's personal computer.

Another drawback is that the selection of assets remain static, and thus get "stale" over time. Many users desire new assets for the printable products. Thus, a user must periodically acquire new disks with new assets in order create printable products with "fresh" assets. Similarly, the engine component may be frequently upgraded with enhanced features (e.g., new types of printable products), and thus the user must acquire new disks with the upgraded engine component in order to utilize the enhanced features.

While it is possible to download new assets and engines over a computer network such as the Internet, the downloading process can be very slow, and significant hard disk resources of the user's personal computer are consumed in order to store the downloaded data.

The present invention addresses these and other drawbacks of the prior art by providing an on-line system for creation of printable products.

SUMMARY OF THE INVENTION

According to the present invention there is provided a system for on-line creation of a printable product, the system comprising: (1) at least one server accessible via a computer network, said at least one server storing defining data defining a plurality of printable products including one or more design elements, and a first program providing modification functions for modifying the defining data, and assembly functions for assembling a printable product suitable for printing; and (2) a client computer for accessing said server, wherein said at least one server downloads said first program to said client computer.

In accordance with another aspect of the present invention, there is provided a computer usable medium having computer readable program code means embodied therein for creating, modifying and printing of a printable product, the computer readable program code means comprising: (1) means for downloading data defining a printable product from a remote storage device; (2) modification means for modifying the defining data; and (3) print formatting means for formatting the defining data for printing.

In accordance with another aspect of the present invention, there is provided a method for generating a printable product using an on-line system accessible via a computer network, the method including the steps of: (a) storing on a server accessible via the computer network, data defining a plurality of printable products including one or more design elements; (b) storing on the server a first program providing modification functions for modifying the defining data, and assembly functions for assembling a printable product suitable for printing; and (c) downloading the first program to a client computer accessing the server, to allow for modification and printing of a printable product at the client computer.

An advantage of the present invention is the provision of an on-line system for creating a printable product that minimizes the consumption of storage resources of a user's computer.

Another advantage of the present invention is the provision of an on-line system for creating a printable product that provides a user with fast and convenient access to updated printed product assets.

Still another advantage of the present invention is the provision of an on-line system for creating a printable product that provides a user with fast and convenient access to enhanced engines.

Still another advantage of the present invention is the provision of an on-line system for creating a printable product that utilizes the functionality of a browser.

Still another advantage of the present invention is the provision of an on-line system for creating a printable product that extends the functionality of a browser by use of plug-ins.

Yet another advantage of the present invention is the provision of an on-line system for creating a printable product which provides a user's computer with extensive editing functions for editing data defining a printable product, including editing functions for formatting a variety of different design elements.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 3 illustrates an exemplary record for a text element, in accordance with a preferred embodiment;

FIG. 4 illustrates an exemplary record for a graphic element, in accordance with a preferred embodiment;

FIG. 5A illustrates an exemplary menu of card selections for customization and printing;

FIG. 5B illustrates an exemplary menu of birthday card selections for customization and printing;

DETAILED DESCRIPTION OF THE PREFERRED EMBODIMENT

Figure 1:
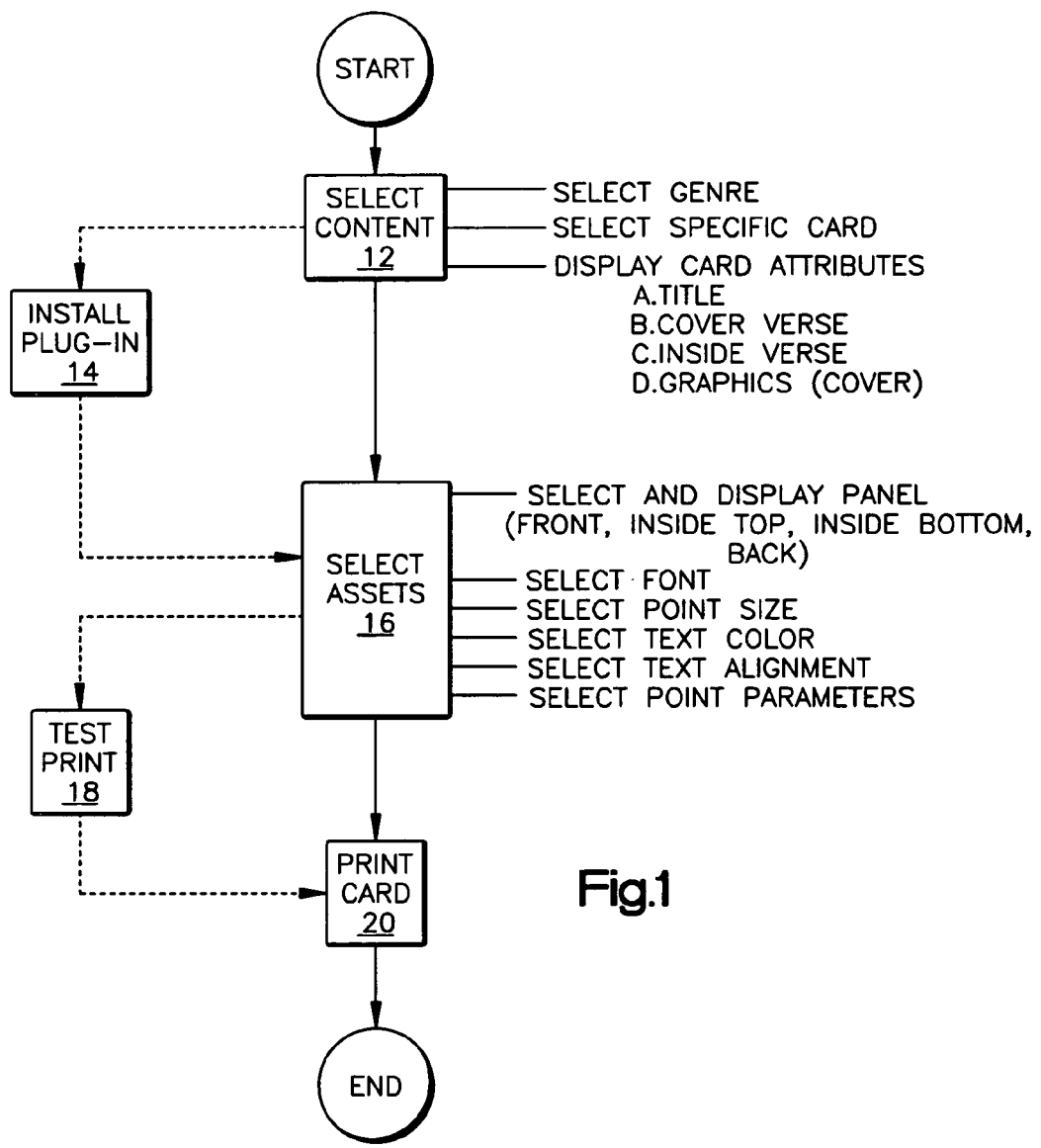
FIG. 1 shows a flow diagram of the user-initiated steps for creating a printable product, according to a preferred embodiment of the present invention.

It should be appreciated that while a preferred embodiment of the present invention will be described in connection with the creation of a printed product taking the form of a greeting card, the printed product make take other forms, including but not limited to: announcements, banners, business cards, calendars, certificates, craft cards, envelopes, gift tags, invitations, labels, message cards, origami, postcards, posters, stationary, stickers and other social expression products. The printed product includes one or more design elements, including but not limited to: text, graphic/image, audio and video. The use of greeting cards in describing a preferred embodiment is not meant in any way to limit the scope of the present invention.

Moreover, it should be appreciated that while a preferred embodiment of the present invention has been described in connection with the Internet, the present invention may be used in conjunction with other computer networks, including other public computer networks, as well as proprietary/private computer networks.

As known in the prior art, the World Wide Web (WWW) comprises many pages or files of information, distributed across many different server computer systems. A wide variety of different types of information may be stored on such pages, and this information can be presented to a user's computer system (typically referred to as "client computer system") using a combination of text, graphics, audio data and video data. Each page is identified by a Universal Resource Locator (URL). The URL denotes both the server machine, and the particular file or page on that machine. There may be many pages or URLs resident on a single server. In order to use the WWW, a client computer system runs a piece of software known as a graphical Web browser, such as "Navigator" available from Netscape Communications Corporation, or "Internet Explorer" available from Microsoft Corporation. "Navigator" is a trademark of the Netscape Communications Corporation, while "Internet Explorer" is a trademark of Microsoft Corporation.

The client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is performed in accordance with the hypertext transport protocol ("HTTP")). This page is then displayed to the user on the client screen. The client may also cause the server to launch an application. Most WWW pages are formatted in accordance with a computer program written in a language known as HTML (hypertext mark-up language). This program contains the data to be displayed via the client's graphical browser as well as formatting commands which tell the browser how to display the data. Thus, a typical Web page includes text together with embedded formatting commands, referred to as tags, which can be used to control the font size, the font style (for example, whether italic or bold), how to lay-out the text, and so on. A Web browser "parses" the HTML script in order to display the text in accordance with the specified format. HTML tags are also used to indicate how graphics, audio and video are manifested to the user via the client's browser.

Most Web pages also contain one or more references to other Web pages, which need not be on the same server as the original page. Such references may generally be activated by the user selecting particular locations on the screen, typically by clicking a mouse control button. These references or locations are known as hyperlinks, and are typically flagged by the browser in a particular manner (for example, any text associated with a hyperlink may be in a different color). If a user selects the hyperlink, then the referenced page is retrieved and replaces the currently displayed page.

A preferred embodiment of the present invention takes advantage of the features of the Internet and Internet web browsers. Moreover, a preferred embodiment of the present invention enhances the utility of the browser by use of a plug-in program, as will be described in detail below. A plug-in program is used to alter, enhance, or extend the operation of a parent application program. The idea behind plug-in's is that a small piece of software is loaded into memory by the larger program, adding a new feature, and that users need only install the few plug-ins that they need, out of a much larger pool of possibilities. Browsers such as Netscape Navigator World-Wide Web browser and Microsoft Internet Explorer supports plug-ins which display or interpret a particular file format or protocol such as Shockwave, RealAudio, Adobe Systems, Inc. PDF, Corel CMX (vector graphics). The file to be displayed is included in a web page using an EMBED HTML tag.

Figure 5B:
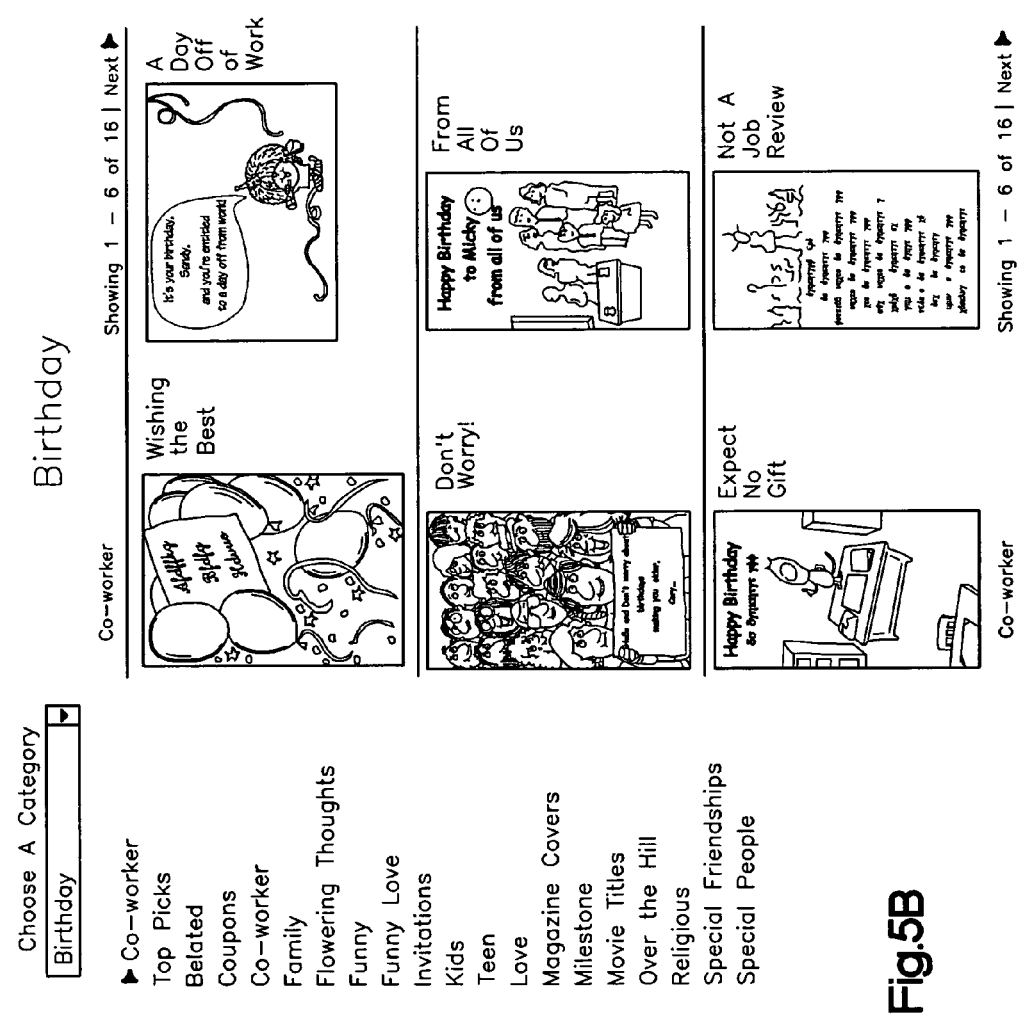
Figure 5C:
FIG. 5C illustrates basic properties of a selected birthday card.

Referring now to the drawings wherein the showings are for the purposes of illustrating a preferred embodiment of the invention only and not for purposes of limiting same, FIG. 1 provides a flow diagram of the user-initiated steps for creating a printable product, according to a preferred embodiment of the present invention. These steps include SELECT CONTENT (step 12) which provides web page displays to the user for selecting genre, selecting a specific card of the selected genre, and displaying the card attributes for the specific selected card. With respect to selection of genre, the user is presented with a listing (and optionally descriptions and samples) of available genres. These genres may divided into categories. Examples of genre categories are: Holidays, Just Because, Friendship, Love, Birthday, Romantic Events, Baby, To Kids, Life Events, Concern & Support, Collections, Inspirational & Religions, Spanish, and Business (FIG. 5A). Each of the genre categories may be subdivided into one or more subcategories. For instance, the Holidays category may have such subcategories as Graduation, Grandparents Day, Jewish New Year, Boss's Day, Sweetest Day, Halloween, Thanksgiving, Hanukkah, Christmas, Kwanza, Hari Raya, New Year's Day, Chinese New Year, Valentines Day, St. Patricks Day, Passover, Easter, Secretaries Day, Mother's Day and Father's Day. To facilitate selection of the categories and subcategories drop down selection boxes and/or hypertext links are displayed to the user. In addition, information associated with the category/subcategory may also be displayed, such as shown in FIG. 5B (e.g., date of the holiday, samples or popular card selections for the category/subcategory, and thumbnail displays of cards for the category/subcategory). Once a specific card is selected by the user, basic display attributes of the selected card are displayed to the user (FIG. 5C). In a preferred embodiment, these display attributes include a card title, cover verse, inside verse and cover graphics. If the user's computer does not have the plug-in program for creation of the printed product, the plug-in will be installed at step 14. The process will then proceed to step 16 described below.

Figure 5D:
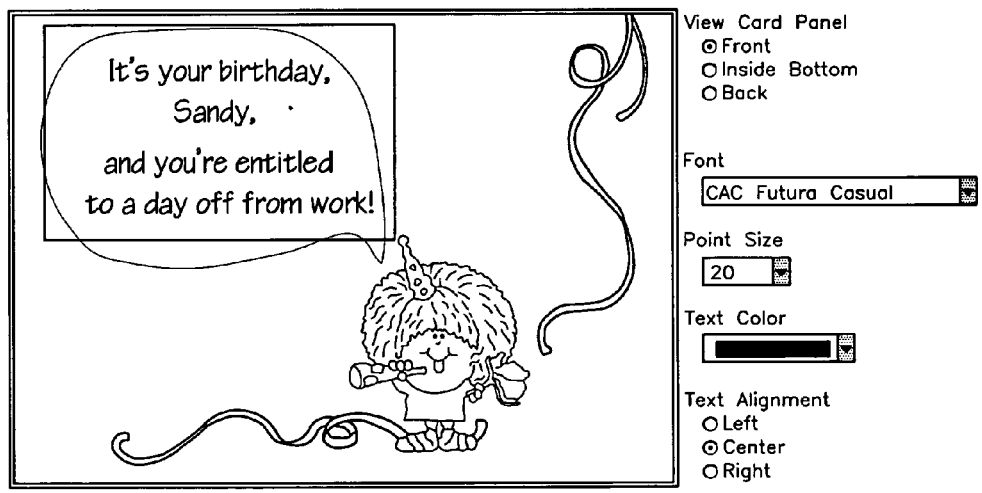
FIG. 5D illustrates a web page which displays the assets of a selected birthday card, and provides means for user modification of the assets.

SELECT ASSETS (step 16) provides web page displays to the user for modifying each panel of the card selected in step 12 (FIG. 5D). In this regard, the user is prompted to select one of the following panels for modification: (1) front, (2) inside top, (3) inside bottom, and (4) back. The graphic elements and text elements appearing on each selected panel is displayed to the user. The user may modify the font, point size, color and alignment (i.e., right, center, left) for the text elements appearing on each panel. In accordance with a preferred embodiment, the user highlights the displayed text to be modified, and then selects the desired font, point size, color and alignment from a menu of drop down selections.

Once the assets have been selected, and the user requests printing, the user is prompted to enter print parameters, namely, single or quarter fold, and the number of copies. The first time the user specifies single fold, the process proceeds to step 18 described below. This is necessary to properly orient the graphic and text elements for a particular printer. CARD PRINT (step 20) prints the single or quarter fold card at the user's local printer. For a single fold print job, the outside of the card is printed first, and the user reinserts the printed page into the local printer as directed, to print the inside of the card. TEST PRINT (step 18) has the user print a first and second test page using their local printer, so that the proper orientation for a single fold print job can be determined.

Figure 6A:
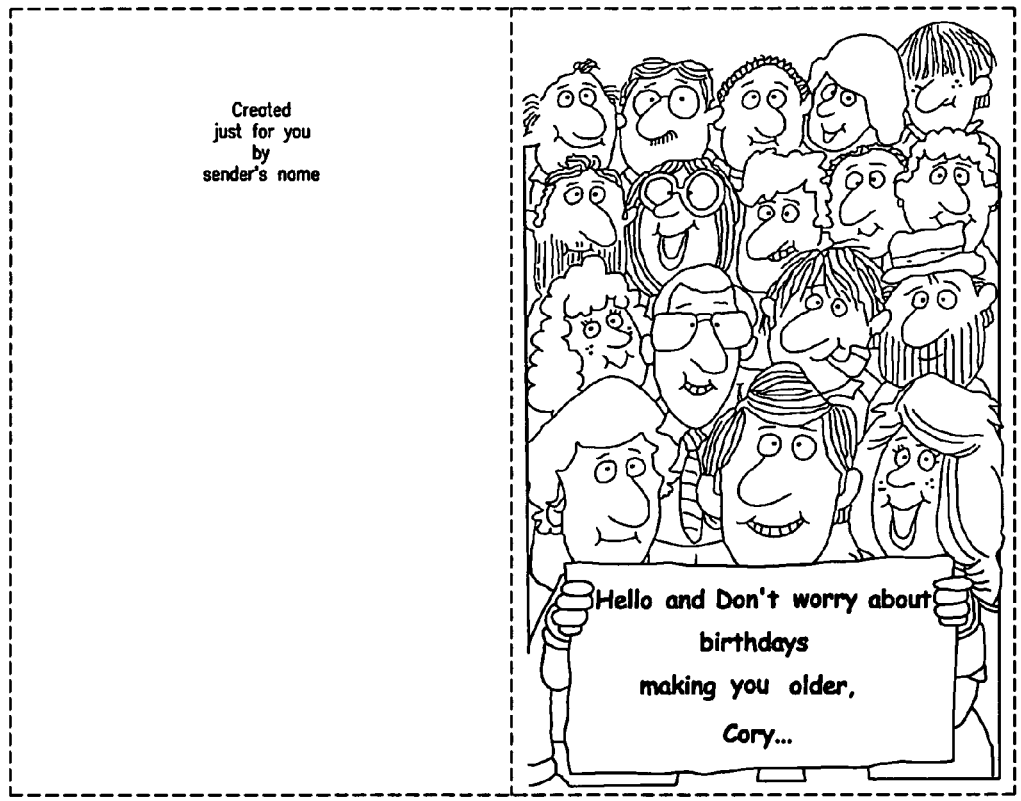
FIG. 6A illustrates the outside panels (front and rear) of a single fold card.
Figure 6B:
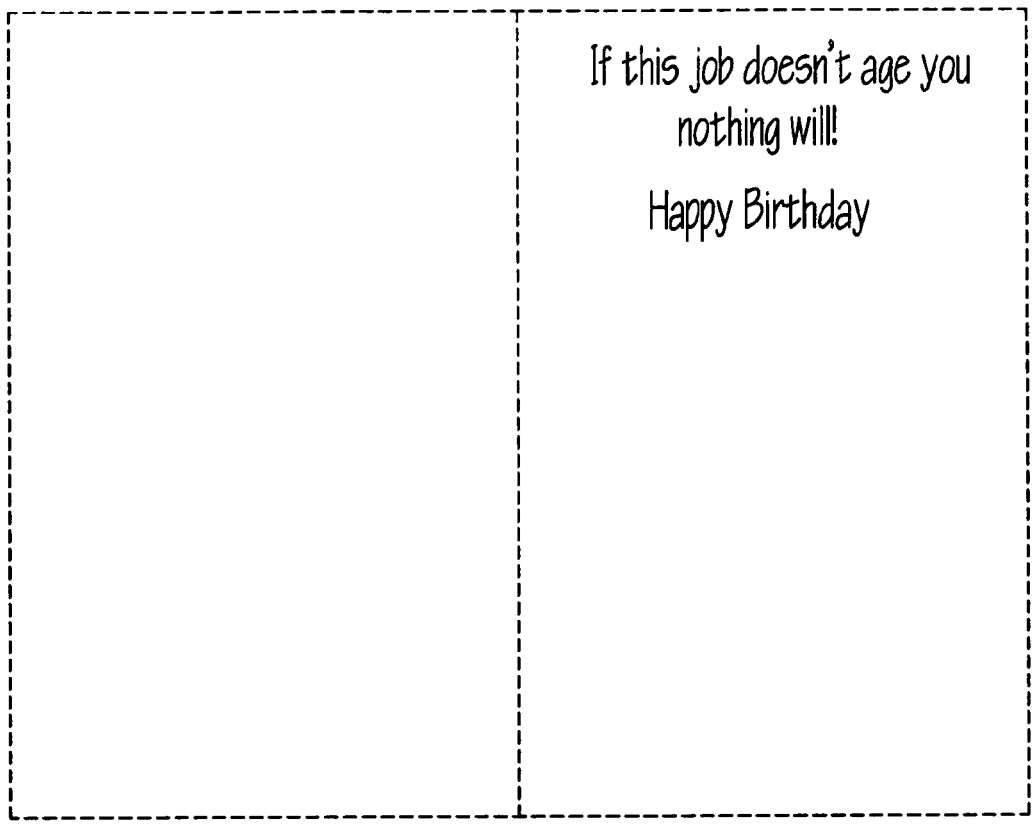
FIG. 6B illustrates the inside panels of a single (half) fold card.
Figure 7:
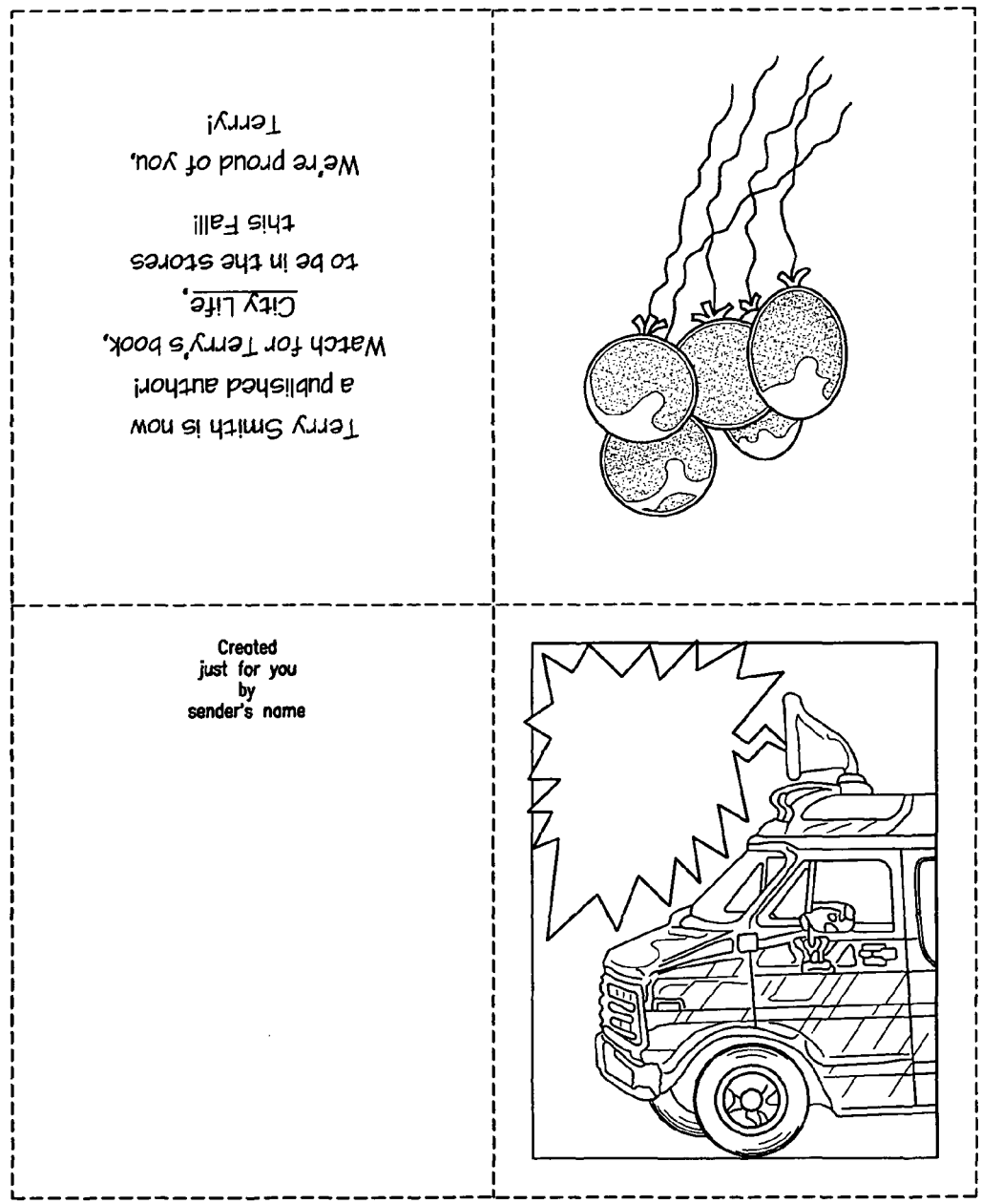
FIG. 7 illustrates all four panels of a double (quarter) fold card.

FIG. 6A illustrates the outside panels (front and rear) of a single fold card; FIG. 6B illustrates the inside panels of a single (half) fold card; and FIG. 7 illustrates all four panels of a double (quarter) fold card.

Figure 2:
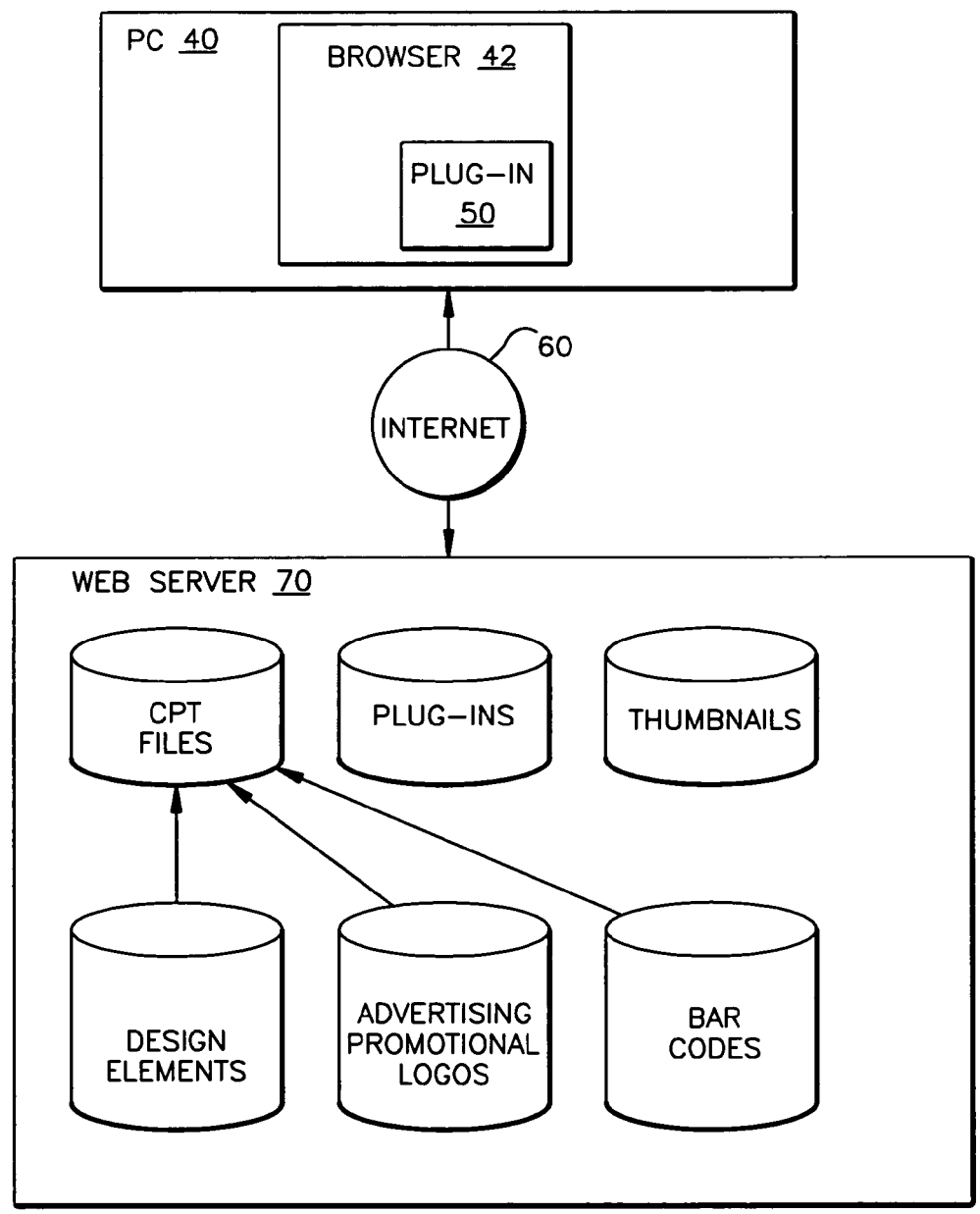
FIG. 2 shows a generally overview of a system arrangement, according to a preferred embodiment of the present invention.

Referring now to FIG. 2 there is shown a generally overview of a system arrangement, according to a preferred embodiment of the present invention. As is well known to those skilled in the art, a personal computer (PC) 40 may communicate with a web server 70 via a computer network (i.e., Internet) 60. A plurality of different types of data may be stored on the web server, including but not limited to, plug-ins 50, "CPT" files, thumbnails (which provide a preview of available printable products in one or more sizes), design elements (e.g., graphics and text elements), advertising, promotional and logo data, and bar code data, as will be described in further detail below.

An appropriate plug-in 50 is downloaded to PC 40 to enhance the functionality of browser 42. In this regard, plug-in 50 includes an engine and assembly component for creating the printed product (including local printing). One function of the engine component is to make selected assets (i.e., design elements) for a printed product available in the browser such that they can be edited by the user. Such assets may include, but are not limited to graphic/image elements, text elements, audio elements, and video elements. Editing functions controlled by the plug-in include but are not limited to, modifying text fonts, modifying text point size, modifying text/graphics color, modifying text/graphics alignment, modifying text/graphics position within a panel, adding new text/graphics elements, deleting text/graphic elements. The editing functions may also include those typically found in word processing and design application software. Additional editing functions suitable to other types of design elements may also be provided.

As mentioned above, plug-in 50 is downloaded to the user' PC 40. As is well known to those skilled in the art, browser 42 includes a table of plug-ins that are invoked upon specified conditions, and thus extend the functionality of the browser. For instance, after plug-in 50 has been downloaded to PC 40, if browser 42 detects a file with a .cpt extension, the plug-in related to that file type will be invoked. In a preferred embodiment, plug-in 50 includes a plurality of ActiveX controls that allow browser 42 to interpret CPT files, which are downloaded as a compressed binary file. It should be understood that the extension "cpt" is selected solely to illustrate a preferred embodiment of the present invention, and that any suitable identifier could be used to invoke the plug-in.

In accordance with a preferred embodiment of the present invention, plug-in 50 is downloaded on demand when it is recognized that the browser accessing web server 70 does not already have plug-in 50 installed, or does not have the latest version of plug-in 50 installed. This auto-detect feature makes it simple for users to have the most up-to-date plug-in with the most current enhancements. It should be appreciated that various types of compression algorithms may be utilized to speed up the downloading process.

It should be understood that in accordance with a preferred embodiment, plug-in 50 (in conjunction with browser 42) will include all, or a portion of, the engine component and assembly component. Preferably, the menu and assets components will reside on web server 70.

Referring now to FIGS. 3 and 4, exemplary database records are shown. FIG. 3 illustrates an exemplary record for a text element, while FIG. 4 illustrates an exemplary record for a graphic element. In this regard, a text element record includes a record identifier, a category (e.g., birthday card, invitation, calendar, origami, etc.), panel no. (e.g., for greeting cards there are four panels; two inside the card and two outside the card), font, point size, color (e.g., hex—RGB), position information (i.e., identify location within the panel relative to one or more reference locations), alignment of the text (i.e., left, right and center), and the text string. Likewise, the graphic element record includes a panel number, position information, and filename of the graphic. It should be understood that the foregoing records may include additional fields, including but not limited to print format data (e.g., specifying whether the text or graphic element is suitable for printing in half-fold and/or quarter fold configurations). This print format data could specify any restrictions or options relating to formatting at the time of printing. Alternatively, the print format data could be externalized and stored separately on the web server.

Web server 70 also may include additional databases for advertising, promotional, logo and/or bar code data that is also printed on the printed product. The advertising, promotional, logo and/or bar code data may be used in connection with several types of printed products. Such records may include an ID field and the display information that is to be printed. Additional fields may be provided for each record to identify the type of printed products and/or the category of printed products. Furthermore, records could be provided which specify that external data (i.e., data outside the cpt file) is to be added to the printed product from another source. For example, the external source data could be an uploaded photograph (e.g., fax gif file) or other graphics file that is added to a birthday card. Another example of external source data is a signature graphic. Reference is made to FIGS. 6A and 7, which illustrate examples of advertising, promotional and logo data that is part of the printed product.

Web server 70 pre-assembles the design elements for a printable product selected by the user. In this regard, an appropriate CPT file is generated and downloaded to PC 40 using plug-in 50. The data in the CPT file is compiled from the design element databases. The CPT file includes all the information for the assets of a printable product (e.g., asset information for all four panels of a greeting card), including the information to display the printable product to the user, allow editing of the assets, and assembly for printing. Importantly, the display, editing and assembly of the printable product defined by the CPT file is performed by plug-in 50. It should be noted that the assembly process performed by plug-in 50 includes (but is not limited to) scaling, resizing and division into panels to accommodate the selected paper fold format (e.g., quarter fold, or half fold).

It should be appreciated that in accordance with an alternative embodiment of the present invention, selected "raw" data (e.g., design elements, advertising, promotional, logos, and bar code data) stored in web server 70 which is used to define a printable product may be downloaded directly to plug-in 50. In this regard, no preassembly takes place to form a CPT file. Since all assembly of the design elements occurs at the user's PC, this approach will be slower than the preferred embodiment.

The present invention can be modified to include Many additional enhancements. For instance, the user can be provided with powerful editing tools to manipulate the graphical and text elements of the printed product. In this regard, a user may add, delete or reposition design elements. Another enhancement of the present invention is to allow the user to store the data defining the completed printed product in a data file. This data file could then be stored in local storage at the user's PC, stored in a portable storage medium (e.g., floppy disk or CD ROM), or stored at a remote location (e.g., at the web server). Furthermore, this data file may be attached to an email for transmission to another party. This portability of the data defining the printed product allows for delayed printing and printing at a different location. This also facilitates the use of portable (including wireless) web appliances, such as personal digital assistants (PDAs), such as the Palm Pilot, and web phones, to create a printed product at a location where there is no printer available, and to print the printable product at a different location where a printer is available.

It should be further understood that the advertising, promotional, logo and/or bar code data could be added to the data defining a completed printed product that is stored and/or transmitted to another location. The bar code could be added prior to storing/transmitting the data, or could be added by another plug-in at the remote receiver's computer. In this regard, the bar code could be used to identify shipping information (e.g., data for matching a product to be delivered with the printed product, such as an order of flowers that are to be delivered with a greeting card). Graphics and text elements identifying the shipper's name could also be provided. Therefore, the present invention also finds utility in area of remote-remote fulfillment.

The attached Appendix includes program code listings associated with the preferred embodiment of the "plug-in" described above.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A system for on-line creation of printable product, the system comprising:
at least one server accessible via a computer network, said at least one server storing defining data defining a plurality of printable products including one or more design elements, and a plug-in program providing modification functions within a web browser program for modifying defining data which is downloaded from the at least one server by the web browser program, and assembly functions for assembling a printable product suitable for printing;
a client computer for accessing said server, wherein said at least one server downloads said plug-in program and said defining data to said client computer; and
a printer operatively coupled with said client computer, wherein said plug-in program assembles printing data for printing the printable product on the printer;
wherein said client computer includes a web browser program for accessing said web server, and wherein said plug-in program enables the modification functions within said web browser program;
wherein said plug-in program controls the downloading to the client computer of the defining data that defines a selected printable product, said defining data defining at least one of: graphical elements, text elements, and formatting data associated with the graphical and text elements;
wherein said assembly of printing data by said plug-in program includes at least one of: resizing, scaling, division into panels that anticipate printing in a desired printing format;
and wherein said modification functions of said plug-in program includes modification of at least one of the design elements selected from the group of: font, color, alignment, position within a panel, adding a design element, and deleting a design element.

2. A system according to claim 1, wherein said plurality of printable products includes at least one of: announcements, banners, business cards, calendars, greeting cards, certificates, craft cards, envelopes, gift tags, invitations, labels, message cards, origami, postcards, posters, stationery and stickers.

3. A system according to claim 1, wherein said defining data defines at least one of: graphical elements, text elements, and formatting data associated with the graphical and text elements.

4. A method for generating a printable product using an online system accessible via a computer network, the method comprising:

storing on a server accessible via the computer network, defining data plurality of printable products including one or more design elements;

storing on the server a plug-in program to enhance the functionality of a web browser program by providing a web browser with modification functions for modifying the defining data and assembly functions for assembling a printable product suitable for printing, wherein the assembly and modification functions occur within the web browser program on a client computer; wherein said plug-in program controls the downloading to the client computer of the defining data of a selected printable product, and wherein said defining data defines at least one of the design elements selected from the group of: graphical elements, text elements, and formatting data associated with the graphical and text elements;

downloading the plug-in program to the client computer accessing the server through the web browser program, to provide for the user modification and printing of a printable product at the client computer via the web browser, using the plug-in program in connection with the web browser to assemble printing data for printing the printable product on the printer, wherein said step of assembling printing data includes at least one of the steps of: resizing, scaling, division into panels that anticipate printing in a desired printing format; and wherein said modification function of said plug-in program further includes the step of modification to at least one of: font, color, alignment, position within a panel, adding a design element, and deleting a design element, and printing the printable product on a printer operatively coupled to the client computer.

5. A computer system for selecting, modifying and printing customized greeting cards comprising:

one or more databases containing multiple greeting cards identified and selectable by contents, genre and attributes, the one or more databases further including selectable assets for each greeting card including graphic and textual designs for front panels, inside panels and back panels of greeting cards, and selectable text elements including font, point size, color, and alignment and print parameters;

a personal computer programmed with an Internet web browser and operatively connected to a web server whereon the one or more databases reside in the form of URL-identifiable pages for transmission to the personal computer via hypertext transport protocol and display formatted according to hypertext mark-up language including one or more embedded formatting commands at least one of which is a plug-in program;

the plug-in program being downloadable to the Internet web browser of the personal computer which is operative to detect and launch the plug-in program by a file extension, the plug-in program including an engine and assembly component for selection, display editing and printing assembly for all panels of a greeting card and printing assembly including scaling and resizing and division into greeting card panels for printing according to a selected greeting card fold format, the plug-in program operative to select, display and edit greeting card text elements including a record identifier, a greeting card category, text element font and point size, text element position on a panel, text element alignment and text string, and addition or deletion of text elements;

printing the greeting card on a printer operatively coupled to the personal computer.

* * * * *